United States Patent
Lin

(10) Patent No.: US 11,757,480 B2
(45) Date of Patent: Sep. 12, 2023

(54) METHOD FOR ESTIMATING A SIGNAL-TO-NOISE RATIO

(71) Applicant: Continental Automotive Technologies GmbH, Hannover (DE)

(72) Inventor: Chao Lin, Toulouse (FR)

(73) Assignee: Continental Automotive Technologies GmbH

( * ) Notice: Subject to any disclaimer, the term of this patent is extended or adjusted under 35 U.S.C. 154(b) by 176 days.

(21) Appl. No.: 17/439,242

(22) PCT Filed: Mar. 21, 2020

(86) PCT No.: PCT/EP2020/057901
§ 371 (c)(1),
(2) Date: Sep. 14, 2021

(87) PCT Pub. No.: WO2020/188113
PCT Pub. Date: Sep. 24, 2020

(65) Prior Publication Data
US 2022/0149875 A1    May 12, 2022

(30) Foreign Application Priority Data

Mar. 21, 2019   (FR) ...................................... 1902904

(51) Int. Cl.
*H04B 1/10*     (2006.01)
*H04B 17/336*   (2015.01)
(Continued)

(52) U.S. Cl.
CPC ......... *H04B 1/1027* (2013.01); *H04B 17/336* (2015.01); *H04L 1/20* (2013.01); *H04W 56/0055* (2013.01)

(58) Field of Classification Search
None
See application file for complete search history.

(56) References Cited

U.S. PATENT DOCUMENTS 5,583,569 A * 12/1996 Kuzma ................ H04N 21/236
                                                375/E7.277
6,445,693 B1    9/2002 Sarraf et al.
(Continued)

FOREIGN PATENT DOCUMENTS

CN    101030787 A    9/2007
CN    101237316 A    8/2008
(Continued)

OTHER PUBLICATIONS

Chinese Office Action for Chinese Application No. 202080022196.8, dated Apr. 2, 2022, with translation, 7 pages.
(Continued)

*Primary Examiner* — Andrew C Oh
(74) *Attorney, Agent, or Firm* — RatnerPrestia

(57) ABSTRACT

A method for estimating a signal-to-noise ratio of a received digital radio signal. The estimating method includes a detecting step consisting in recovering a received synchronization symbol contained in the received digital radio signal, and an estimating step configured to determine the signal-to-noise ratio of the received digital radio signal, depending on the difference between a first received synchronization signal and a second received synchronization signal. The first and second received synchronization signals are comprised in the received synchronization symbol.

11 Claims, 1 Drawing Sheet

(51) Int. Cl.
*H04L 1/20* (2006.01)
*H04W 56/00* (2009.01)

(56) References Cited

U.S. PATENT DOCUMENTS

| | | | |
|---|---|---|---|
| 7,702,307 B2 | 4/2010 | Taipale et al. | |
| 7,761,106 B2* | 7/2010 | Konchitsky | H04R 1/406 455/114.2 |
| 8,358,994 B2 | 1/2013 | Li | |
| 8,929,489 B2* | 1/2015 | Vervisch-Picois | G01S 19/11 375/345 |
| 9,419,697 B1* | 8/2016 | Kopikare | H04B 7/061 |
| 9,763,177 B1* | 9/2017 | Baskaran | H04J 11/0073 |
| 9,936,373 B2* | 4/2018 | Schier | H04W 52/244 |
| 10,778,291 B1* | 9/2020 | Wang | H04B 17/0087 |
| 10,892,789 B2* | 1/2021 | Abdelmonem | H04L 5/0073 |
| 2003/0174643 A1* | 9/2003 | Ro | H04L 5/0007 370/210 |
| 2005/0117504 A1* | 6/2005 | Ogawa | G11B 7/005 369/53.19 |
| 2007/0218959 A1* | 9/2007 | Kim | H04M 1/6083 455/569.2 |
| 2008/0298485 A1* | 12/2008 | Lu | H04L 5/0048 375/260 |
| 2008/0316369 A1* | 12/2008 | Yamamoto | H04N 5/50 348/E5.097 |
| 2010/0138878 A1 | 6/2010 | Kim et al. | |
| 2010/0238877 A1* | 9/2010 | Nam | H04L 5/0007 370/329 |
| 2011/0064163 A1* | 3/2011 | Li | H04L 27/2647 375/316 |
| 2011/0090975 A1* | 4/2011 | Al-Naffouri | H04L 25/022 375/260 |
| 2013/0196659 A1* | 8/2013 | Damji | H04W 52/0229 455/434 |
| 2015/0319543 A1* | 11/2015 | Xia | H04R 25/356 381/321 |
| 2016/0277159 A1* | 9/2016 | Hillenius | H04B 7/0857 |
| 2017/0195158 A1* | 7/2017 | Lin | H04L 5/0032 |
| 2018/0092159 A1* | 3/2018 | Azarian Yazdi | H04L 67/145 |
| 2018/0262313 A1* | 9/2018 | Nam | H04L 5/0044 |
| 2018/0302889 A1* | 10/2018 | Guo | H04B 7/0695 |
| 2018/0359716 A1* | 12/2018 | Bai | H04W 56/0015 |
| 2019/0053313 A1* | 2/2019 | Zhou | H04W 52/50 |
| 2020/0154287 A1* | 5/2020 | Novlan | H04L 5/0075 |
| 2020/0267670 A1* | 8/2020 | Åström | H04W 48/10 |
| 2020/0287640 A1* | 9/2020 | Wang | H04W 24/10 |
| 2020/0288323 A1* | 9/2020 | Silverman | H04W 74/0825 |

FOREIGN PATENT DOCUMENTS

| | | | | |
|---|---|---|---|---|
| CN | 103916342 A | | 7/2014 | |
| EP | 2194666 A1 | | 6/2010 | |
| EP | 2579488 A1 | | 4/2013 | |
| KR | 20200039518 A | * | 4/2020 | H04W 28/0205 |
| KR | 20200085062 A | * | 7/2020 | H04W 72/30 |
| WO | WO-2014180794 A1 | * | 11/2014 | H04B 1/0475 |
| WO | WO-2017097033 A1 | * | 6/2017 | H04B 7/0413 |
| WO | WO-2019065189 A1 | * | 4/2019 | H04B 17/309 |
| WO | WO-2019191906 A1 | * | 10/2019 | |

OTHER PUBLICATIONS

Baumgartner, S., et al., "A Modified Maximum Likelihood Method for SNR Estimation in OFDM Based Systems," pp. 155-158, 2014 IEEE International Conference on Consumer Electronics (ICCE).
Pauluzzi, D.R., et al., "A Comparison of SNR Estimation Techniques in the AWGN Channel," 1995 IEEE, pp. 36-39, Article in IEEE Transactions on Communications, Jan. 2000.
International Search Report and Written Opinion for International Application No. PCT/EP2020/057901, dated Apr. 22, 2020, with partial English translation, 8 pages.
International Search Report and Written Opinion for International Application No. PCT/EP2020/057901, dated Apr. 22, 2020, 11 pages (French).
Notification to Grant Patent Right for Invention for Chinese Application No. 202080022196.8, dated Oct. 12, 2022 with translation, 6 pages.
English Translation of the Written Opinion for International Application No. PCT/EP2020/057901, dated Apr. 22, 2020, 6 pages.

* cited by examiner

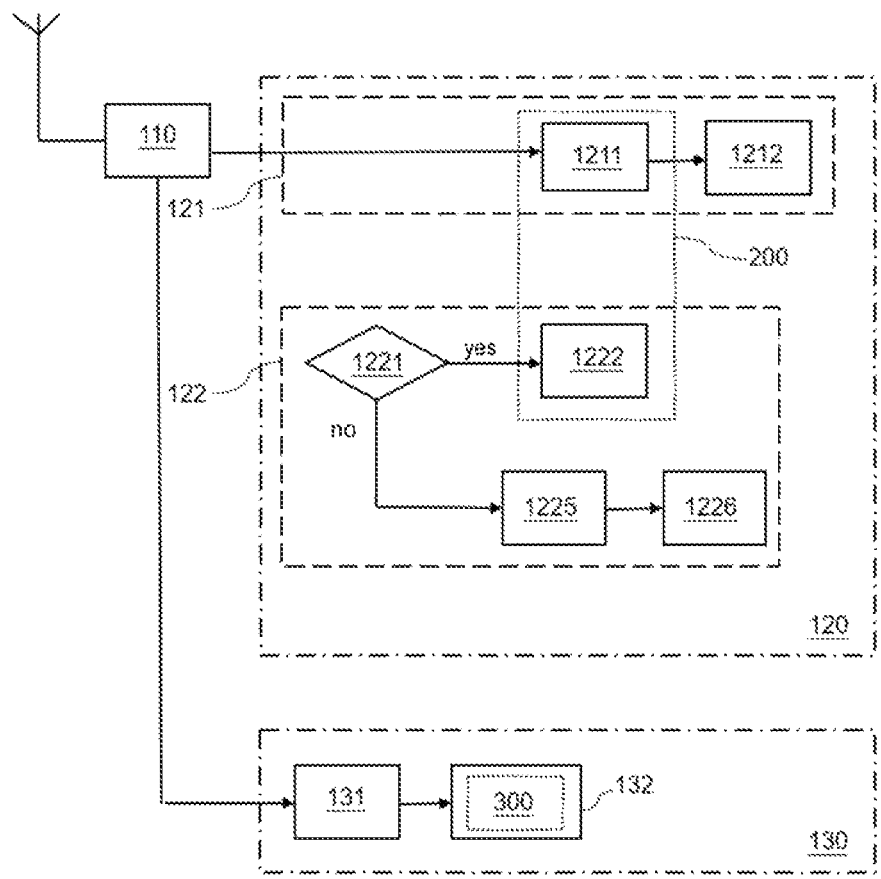
[Fig. 1]
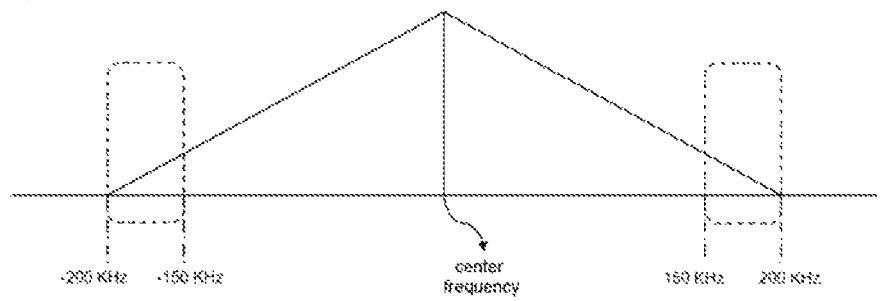
[Fig. 2]
[Fig. 3]
| CP | Sa(t) | Sb(t) |

METHOD FOR ESTIMATING A SIGNAL-TO-NOISE RATIO

CROSS REFERENCE TO RELATED APPLICATIONS

This application is the U.S. National Phase application of PCT International Application No. PCT/EP2020/057901, filed Mar. 21, 2020, which claims priority to French Patent Application No. 1902904, filed Mar. 21, 2019, the contents of such applications being incorporated by reference herein.

FIELD OF THE INVENTION

The present invention generally relates to a method for estimating a signal-to-noise ratio (SNR) of a radio signal.

The invention especially relates to a method for estimating a signal-to-noise ratio of a modulated radio signal comprising a synchronization symbol.

BACKGROUND OF THE INVENTION

Signal-to-noise ratio is often considered an important parameter for evaluating the reliability of data after demodulation of a radio signal received by a radio receiver, and for estimating the quality of a channel used for the transmission of the radio signal. Signal-to-noise ratio is therefore used to determine radio-signal processing strategies, such as soft mute, the search function, and signal blending for analog radio signals (e.g. FM signals), and seamless transition, concealment and frequency hopping for digital radio signals (e.g. DAB, DRM and CDR signals). Thus, the quality of signals received by radio receivers may be improved.

The above terms FM, DAB, DRM, CDR are abbreviations designating the frequency modulation (FM) of a radio signal and the digital radio standards digital audio broadcasting (DAB), digital radio mondiale (DRM) and convergent digital radio (CDR), respectively. The CDR radio standard, as defined in the CDR standard document GY/T 268.1/2-2013, is a new in-band on-channel (IBOC) radio standard designed for simultaneous transmission of digital and analog radio in the same frequency band, or for the transmission of digital radio in the FM band (87 MHz to 108 MHz). This CDR radio standard is mainly used in China.

To estimate the signal-to-noise ratio of a received analog radio signal, a plurality of conventional methods, such as the EMV method (EMV being the acronym of envelope mean variance), may be employed. With digital radio signals, the signal-to-noise ratio may be estimated using methods applied in the frequency domain (e.g. learning OFDM pilot symbols) or using methods applied in the time domain (e.g. use of a cyclic prefix). The term "OFDM" is the abbreviation orthogonal frequency-division multiplexing.

Nevertheless, known methods for estimating signal-to-noise ratio comprise difficult and complicated computations. Some of them rely on a cyclic prefix the length of which is limited, this limiting the accuracy of the estimation of the signal-to-noise ratio of the received radio signal. Some others may easily be affected by parameters related to the external environment or to frequency, or by the delay caused by frequency selective fading.

There is therefore a need for a solution allowing, with respect to known methods, signal-to-noise ratio to be estimated in a way that is simpler, more efficient and more robust.

SUMMARY OF THE INVENTION

To achieve this result, an aspect of the present invention relates to a method for estimating a signal-to-noise ratio (SNR) of a received digital radio signal, the estimating method comprising a detecting step consisting in recovering a received synchronization symbol contained in the received digital radio signal; and an estimating step configured to determine the signal-to-noise ratio of the received digital radio signal, depending on the difference between a first received synchronization signal and a second received synchronization signal, the first and second received synchronization signals being comprised in the received synchronization symbol.

An aspect of the invention thus allows, with respect to known methods, signal-to-noise ratio to be estimated in a way that is simpler, more efficient and more robust.

Advantageously, said signal-to-noise ratio is a ratio between, on the one hand, two times a value of the second received synchronization signal and, on the other hand, the difference between the first and second received synchronization signals.

Advantageously, the received digital radio signal corresponds to a modulated digital radio signal comprising an initial synchronization symbol, the initial synchronization symbol comprising a first synchronization signal and a second synchronization signal, said first and second synchronization signals being identical.

Preferably, the first received synchronization signal comprises the first synchronization signal and a first noise signal, and the second received synchronization signal comprises the second synchronization signal and a second noise signal, the estimating step being carried out depending on the similarity between the first synchronization signal and the second synchronization signal of the initial synchronization symbol, and on the inconsistency between the first noise signal and the second noise signal.

Preferably, the received digital radio signal comprises a plurality of successive symbols the first symbol of which is said received synchronization symbol, said received synchronization symbol being a beacon symbol defined in accordance with the CDR standard, CDR being the acronym of convergent digital radio.

An aspect of the invention also relates to a radio receiver configured to estimate a signal-to-noise ratio of a received digital radio signal, the radio receiver comprising a module configured to implement the estimating method such as above.

An aspect of the present invention further relates to a method for estimating a signal-to-noise ratio of a received analog radio signal after transmission, in which the received analog radio signal is transmitted in a frequency band in which a digital radio signal is also transmitted; and said first signal-to-noise ratio is determined depending on a second signal-to-noise ratio of said received digital radio signal, the second signal-to-noise ratio being computed by means of the estimating method such as above.

Advantageously, the first signal-to-noise ratio is computed by multiplying the second signal-to-noise ratio by a correlation coefficient.

Advantageously, the correlation coefficient is determined depending on a spectrum mode chosen for the transmission of the analog radio signal and of the digital analog radio signal.

Preferably, the correlation coefficient is equal to 0.701.

An aspect of the invention also relates to a radio receiver configured to estimate a signal-to-noise ratio of a received analog radio signal, the radio receiver comprising a module configured to implement the estimating method such as briefly described above, configured to estimate a signal-to-noise ratio of a received analog radio signal.

DESCRIPTION OF THE DRAWINGS

Other features and advantages of aspects of the invention will become more clearly apparent on reading the following description. This description is purely illustrative and must be read with reference to the attached drawings, in which:

FIG. 1 illustrates a processing method carried out by a radio receiver according to one embodiment of the invention;

FIG. 2 illustrates a schematic diagram of a spectrum mode employed for the modulation and transmission of a radio signal; and FIG. 3 illustrates an example of an initial synchronization symbol contained in a modulated radio signal before transmission.

It will be noted that the figures illustrate aspects of the invention in detail with regard to implementation thereof, said figures of course being able, where appropriate, to serve to better define aspects of the invention.

DESCRIPTION OF THE EMBODIMENTS

FIG. 1 illustrates a processing method 100 carried out by a radio receiver so as to demodulate a radio signal received by the radio receiver. The received radio signal, which comprises a received digital radio signal, corresponds to a radio signal modulated by OFDM and transmitted in a frequency band.

The processing method 100 comprises a method 200 for estimating a signal-to-noise ratio of said received digital radio signal. Said estimating method 200 is the subject of an aspect of the invention and will be described in the following paragraphs. In addition, to facilitate comprehension of an aspect of the invention, certain steps carried out before and after the estimating method 200 is carried out will also be described in the following paragraphs.

Said radio receiver consists of modules or equipment such as an antenna, one or more tuners and one or more mixers. An aspect of the invention is independent of the modules or equipment used.

Preferably, the radio signal is modulated according to one of the following radio standards: DAB, DRM and CDR. Even more advantageously, the radio signal is modulated according to the CDR radio standard.

In one advantageous (but non-limiting) embodiment, the received radio signal further comprises a received analog radio signal. Preferably, the received analog radio signal is an FM radio signal. In this case, the processing method 100 further comprises an estimating method 300 configured to estimate a signal-to-noise ratio of said received analog radio signal. The estimating method 300 will also be described in the following paragraphs.

An example of the transmission of a modulated radio signal comprising a digital radio signal and an analog radio signal is illustrated in FIG. 2. In this example, the modulated radio signal is a CDR radio signal, and is transmitted using OFDM subcarriers. A hybrid spectrum mode, such as spectrum mode 9 defined in the CDR standard document GY/T 268.1/2-2013, should be used for the transmission of the CDR radio signal, as indicated in the schematic diagram in FIG. 2. Thus, the digital radio signal (called "the digital part") and the analog radio signal (called "the digital part") of the CDR radio signal are transmitted in the same frequency band, preferably from −200 KHz to 200 KHz, the digital radio signal being transmitted in two side bands (e.g. −200 KHz to −150 KHz and 150 KHz to 200 KHz) of said frequency band while the analog radio signal is transmitted in a part closer to the center frequency of said frequency band. The digital radio signal and the analog radio signal correspond to the received digital radio signal and to the received analog radio signal after transmission, respectively.

In the embodiment in which the radio signal is modulated according to the CDR radio standard, the modulated radio signal comprises one or more frames of 640 ms. A frame comprises four sub-frames, each of which lasts 160 ms. The subframes each comprise a plurality of successive symbols, the first symbol of which is a synchronization symbol. According to the CDR radio standard, the plurality of successive symbols are OFDM symbols in a temporal order. In addition, the synchronization symbol comprises only data used for synchronization whereas the other symbols following said synchronization symbol each comprise some of the data of the radio signal to be transmitted. An example of a synchronization symbol will be described in more detail in the following paragraphs and with reference to FIG. 3.

The processing method 100 comprises the following steps: a step 110 of filtering and a step 120 of processing the received digital radio signal. In an embodiment in which the received radio signal comprises not only the digital part (but also the analog part) the processing method 100 further comprises a step 130 of processing the analog radio signal.

The filtering step 110 comprises conventional steps carried out by the one or more tuners and the amplifier of the radio receiver, so as to receive the modulated and transmitted radio signal, to preserve the part of the radio signal received at a desired frequency and to amplify said preserved part of the received radio signal, etc. At the end of the filtering step 110, the received digital radio signal and, where appropriate, the received analog radio signal, will have been extracted from the received radio signal. An aspect of invention is independent of this filtering step 110.

Next, the step of processing the received digital radio signal 120, which comprises the estimating method 200, is carried out in order to demodulate the received digital radio signal. The estimating method 200 comprises a detecting step 1221 and an SNR-estimating step 1222. Preferably, the detecting step 1221 and the SNR-estimating step 1222 are carried out in an acquiring mode 121 and another operating mode 122 of the step of processing the received digital radio signal 120, respectively.

The acquiring mode 121 comprises two steps 1211 and 1212. The detecting step 1211 consists in recovering a received synchronization symbol contained in the received digital radio signal. The synchronizing step 1212 is then carried out, using pilot symbols recovered in the detecting step 1211, a time and frequency synchronization. Preferably, the synchronizing step 1212 may be carried out by applying a known method. An aspect of the invention is therefore independent of the method applied to carry out the synchronizing step 1212.

Following the acquiring mode 121, the radio receiver continues to the operating mode 122 comprising steps 1221, 1222, 1225 and 1226, which are described below.

As mentioned above, a determining step 1221 is performed to determine whether a symbol contained in the received digital radio signal is a received synchronization symbol or not. Specifically, after the acquiring mode 121 has been implemented, all the symbols contained in the received digital radio signal will have been identified. If the result of this determining step 1221 indicates that the symbol is a received synchronization symbol, then the SNR-estimating step 1222 is performed, using the received synchronization symbol, so as to estimate a signal-to-noise ratio of the received digital radio signal. As mentioned above, this SNR-estimating step 1222 forms part of the estimating method 200.

The received synchronization symbol recovered from the received digital radio signal comprises a first received synchronization signal Ŝa(t) and a second received synchronization signal Ŝb(t), the latter two corresponding to a first synchronization signal Sa(t) and to a second synchronization signal Sb(t) contained in an initial synchronization symbol corresponding to the received synchronization symbol, respectively. FIG. 3 illustrates an example of the initial synchronization symbol. In this example, the initial synchronization symbol further comprises a cyclic prefix (CP) that precedes the first and second synchronization signals Sa(t) and Sb(t). The length of the cyclic prefix is very limited with respect to that of the first synchronization signal Sa(t) or to that of the second synchronization signal Sb(t).

During the transmission of the modulated radio signal, noise is generated, this leading to a difference between the received synchronization symbol and its initial synchronization symbol. In other words, the first received synchronization signal Ŝa(t) of the received synchronization symbol comprises the first synchronization signal Sa(t) of the initial synchronization symbol and a first noise signal na(t), the latter being generated during the transmission. Similarly, the second received synchronization signal Ŝb(t) of the received synchronization symbol comprises the second synchronization signal Sb(t) of the initial synchronization symbol and a second noise signal nb(t) also generated during the transmission. This is expressed by the following two equations (1) and (2):

$$\hat{S}a(t) = Sa(t) + na(t) \quad \text{[Math. 1]}$$

$$\hat{S}b(t) = Sb(t) + nb(t) \quad \text{[Math. 2]}$$

In one preferred but non-limiting embodiment, the first and second synchronization signals Sa(t) and Sb(t) comprise synchronization data that are known beforehand by the radio receiver. In one advantageous embodiment, the first and second synchronization signals Sa(t) and Sb(t) are similar or even identical, as the two identical synchronization signals of a "beacon symbol" defined in accordance with the CDR radio standard.

In contrast, there is no correlation between the first noise signal na(t) and the second noise signal nb(t). The signal-to-signal-noise ratio of the received digital radio signal may therefore use the similarity between the first and second synchronization signals Sa(t) and Sb(t) of the same initial synchronization symbol, and the inconsistency between the first noise signal na(t) and the second noise signal nb(t). In this way, the estimation of said signal-to-noise ratio does not particularly rely on the cyclic prefix, the length of which is very limited. This estimation is also not easily affected by parameters related to the external environment or to frequency. Thus, the accuracy of the estimation of the signal-to-noise ratio is considerably improved.

Preferably, said signal-to-noise ratio may be easily achieved depending on the difference between the first received synchronization signal Ŝa(t) and the second received synchronization signal Ŝb(t) of the same received synchronization symbol. Advantageously, said signal-to-signal-noise ratio is determined depending on a ratio X between, on the one hand, the sum of the two received synchronization signals Ŝa(t) and Ŝb(t) of the received synchronization symbol and, on the other hand, said difference between the first and second received synchronization signals Ŝa(t) and Ŝb(t). Even more precisely, said signal-to-noise ratio of the received digital radio signal is obtained using the following equation, equation (3):

$$SNR = \frac{\hat{S}a(t) + \hat{S}b(t)}{\hat{S}a(t) - \hat{S}b(t)} - 1 = X - 1 \quad \text{[Math. 3]}$$

In one example of implementation of the estimating method 200, the signal-to-noise ratio of the received digital radio signal is half of said ratio X.

Alternatively, the signal-to-noise ratio of the received digital radio signal is a ratio (different from the ratio X) between, on the one hand, two times a value of said second received synchronization signal Ŝb(t) and, on the other hand, said difference between the first and second received synchronization signals Ŝa(t) and Ŝb(t) of the same received synchronization symbol, as expressed by the following equation, equation (4), which is deduced from equation (3) above:

$$SNR = \frac{\hat{S}a(t) + \hat{S}b(t)}{\hat{S}a(t) - \hat{S}b(t)} - 1 = \frac{2 * \hat{S}b(t)}{\hat{S}a(t) - \hat{S}b(t)} \quad \text{[Math. 4]}$$

The estimating method 200 of an aspect of the invention thus allows the signal-to-noise ratio of the received digital radio signal to be estimated in manner that is, compared to known methods, simple, efficient and robust.

In another case where the result of the determining step 1221 shows that the symbol is not a received synchronization symbol, a channel-equalizing step 1225 and a channel-decoding step 1226 are respectively carried out using said symbol. It will be noted that an aspect of the invention is independent of the channel-equalizing step 1225 and of the channel-decoding step 1226.

As mentioned above, in the case where the received analog radio signal is extracted at the end of the filtering step 110, the step 130 of processing the received analog radio signal is carried out with a view to demodulating the received analog radio signal.

This step 130 of processing the received analog radio signal comprises two steps 131 and 132. In one embodiment in which the received analog radio signal is an FM signal, step 131 consists in carrying out, preferably in a conventional manner, FM demodulation of the received analog radio signal. An aspect of the invention is independent of the method applied to carry out step 131.

Next, the SNR-estimating step 132 is performed to estimate a signal-to-noise ratio of the received analog radio signal. In this step 132, the estimating method 300 according to an aspect of the invention is carried out so as to estimate said signal-to-noise ratio (called "the first signal-to-noise ratio") of the received analog radio signal, depending on the signal-to-noise ratio (called "the second signal-to-noise ratio") of the received digital radio signal, which will have already been obtained by carrying out the estimating method 200.

Preferably, the first signal-to-noise ratio is computed by multiplying the second signal-to-noise ratio by a correlation coefficient α.

The correlation between the first and second signal-to-noise ratios exists because of the nature of IBOC radio broadcasting—i.e. the transmission of the digital radio signal and of the analog radio signal shares the same frequency band, as mentioned above.

Preferably, the correlation coefficient α is determined depending on a spectrum mode chosen for the transmission of the modulated radio signal. In one embodiment in which the chosen spectrum mode is spectrum mode 9 of the CDR radio standard, the correlation coefficient α is equal to 0.701.

An aspect of the invention thus allows the signal-to-noise ratio of the received digital radio signal and the signal-to-noise ratio of the received analog radio signal to be estimated in a manner that is, compared to known methods, simple, efficient and robust.

An aspect of the invention is not limited to the embodiments described above but encompasses any embodiment conforming to its spirit.

The invention claimed is:

1. A method for estimating a signal-to-noise ratio of a received digital radio signal, the estimating method comprising:
   a detecting step consisting in recovering a received synchronization symbol contained in the received digital radio signal; and
   an estimating step configured to determine the signal-to-noise ratio of the received digital radio signal, depending on the difference between a first received synchronization signal and a second received synchronization signal, the first and second received synchronization signals being comprised in the received synchronization symbol.

2. The estimating method as claimed in claim 1, wherein said signal-to-noise ratio is a ratio between, on the one hand, two times a value of the second received synchronization signal and, on the other hand, the difference between the first and second received synchronization signals.

3. The estimating method as claimed in claim 2, wherein the received digital radio signal corresponds to a modulated digital radio signal comprising an initial synchronization symbol, the initial synchronization symbol comprising a first synchronization signal and a second synchronization signal, said first and second synchronization signals being identical.

4. The estimating method as claimed in claim 3, wherein the first received synchronization signal comprises the first synchronization signal and a first noise signal, and the second received synchronization signal comprises the second synchronization signal and a second noise signal, the estimating step being carried out depending on the similarity between the first synchronization signal and the second synchronization signal of the initial synchronization symbol, and on the inconsistency between the first noise signal and the second noise signal.

5. The estimating method as claimed in claim 1, wherein the received digital radio signal comprises a plurality of successive symbols the first symbol of which is said received synchronization symbol, said received synchronization symbol being a beacon symbol defined in accordance with the CDR standard, CDR being the acronym of convergent digital radio.

6. A method for estimating a first signal-to-noise ratio of a received analog radio signal after transmission, comprising:
   transmitting the received analog radio signal in a frequency band in which a digital radio signal is also transmitted; and
   determining said first signal-to-noise ratio depending on a second signal-to-noise ratio of said received digital radio signal, the second signal-to-noise ratio being computed by the estimating method as claimed in claim 1.

7. The estimating method as claimed in claim 6, wherein the first signal-to-noise ratio is computed by multiplying the second signal-to-noise ratio by a correlation coefficient.

8. The estimating method as claimed in claim 7, wherein the correlation coefficient is determined depending on a spectrum mode chosen for the transmission of the analog radio signal and of the digital analog radio signal.

9. The estimating method as claimed in claim 8, wherein the correlation coefficient is equal to 0.701.

10. A radio receiver configured to estimate a signal-to-noise ratio of a received analog radio signal, comprising a module configured to implement the estimating method as claimed in claim 6.

11. A radio receiver configured to estimate a signal-to-noise ratio of a received digital radio signal, comprising a module configured to implement the estimating method as claimed in claim 1.

* * * * *